United States Patent
Tomioka

(10) Patent No.: US 10,994,489 B2
(45) Date of Patent: May 4, 2021

(54) OPTICAL SHAPING APPARATUS, MANUFACTURING METHOD, AND STORAGE MEDIUM

(71) Applicant: CANON KABUSHIKI KAISHA, Tokyo (JP)

(72) Inventor: Yuichi Tomioka, Utsunomiya (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 0 days.

(21) Appl. No.: 16/299,533

(22) Filed: Mar. 12, 2019

(65) Prior Publication Data

US 2019/0210292 A1 Jul. 11, 2019

Related U.S. Application Data

(63) Continuation of application No. PCT/JP2017/034198, filed on Sep. 22, 2017.

(30) Foreign Application Priority Data

Sep. 29, 2016 (JP) .............................. JP2016-191582

(51) Int. Cl.
*B29C 64/393* (2017.01)
*B29C 64/277* (2017.01)
(Continued)

(52) U.S. Cl.
CPC .......... *B29C 64/393* (2017.08); *B29C 64/129* (2017.08); *B29C 64/135* (2017.08);
(Continued)

(58) Field of Classification Search
CPC ......... B33Y 10/00; B33Y 30/00; B33Y 50/02; B29C 64/129; B29C 64/135; B29C 64/277; B29C 64/393; B29C 67/00
(Continued)

(56) References Cited

U.S. PATENT DOCUMENTS

| 4,945,032 A | 7/1990 | Murphy |
| 5,175,077 A | 12/1992 | Grossa |

(Continued)

FOREIGN PATENT DOCUMENTS

| CN | 103737929 A | 4/2014 |
| JP | H01228828 A | 9/1989 |

(Continued)

OTHER PUBLICATIONS

English translation of Written Opinion issued in Intl. Appln. No. PCT/JP2017/034198 dated Nov. 28, 2017, previously cited in IDS filed Mar. 13, 2019.

(Continued)

*Primary Examiner* — Chun Cao
(74) *Attorney, Agent, or Firm* — Rossi, Kimms & McDowell LLP

(57) ABSTRACT

An optical shaping apparatus includes a first optical unit including a light modulation element that has a plurality of pixels and modulates light from a first light source for each pixel and irradiating modulation light from the light modulation element onto the photocurable resin through the light-transmissive portion, a second optical unit including a scanning member configured to deflect light from a second light source, the second optical unit being configured to irradiate scanning light from the scanning member onto the photocurable resin through the light-transmissive portion, the first and second optical units not including a common optical member, and a controller that controls the light modulation element and the scanning member so as to irradiate the modulation light onto a first resin area, and to irradiate the scanning light onto a second resin area in the photocurable resin.

14 Claims, 12 Drawing Sheets

(51) Int. Cl.
*B33Y 50/02* (2015.01)
*B33Y 10/00* (2015.01)
*B33Y 30/00* (2015.01)
*B29C 64/135* (2017.01)
*B29C 64/129* (2017.01)

(52) U.S. Cl.
CPC ............ *B29C 64/277* (2017.08); *B33Y 10/00* (2014.12); *B33Y 30/00* (2014.12); *B33Y 50/02* (2014.12)

(58) Field of Classification Search
USPC ........................................................ 700/118
See application file for complete search history.

(56) References Cited

U.S. PATENT DOCUMENTS

| | | | |
|---|---|---|---|
| 5,902,537 A | 5/1999 | Almquist | |
| 7,014,988 B2* | 3/2006 | DeVoe | G02B 6/1221 430/321 |
| 7,670,541 B2 | 3/2010 | Kuzusako | |
| 8,142,179 B2 | 3/2012 | Kihara | |
| 9,529,371 B2 | 12/2016 | Nakamura | |
| 9,931,828 B2 | 4/2018 | Kobayashi | |
| 10,618,270 B2* | 4/2020 | Knecht | B33Y 10/00 |
| 2003/0033128 A1 | 2/2003 | Nagano | |
| 2006/0078831 A1* | 4/2006 | DeVoe | G03C 5/00 430/321 |
| 2009/0140172 A1 | 6/2009 | Kihara | |
| 2009/0140466 A1 | 6/2009 | Kuzasako | |
| 2010/0027956 A1* | 2/2010 | DeVoe | G02B 6/1221 385/142 |
| 2013/0221551 A1 | 8/2013 | Genda | |
| 2014/0107823 A1 | 4/2014 | Huang | |
| 2015/0088292 A1 | 3/2015 | Inoue | |
| 2015/0277146 A1 | 10/2015 | Crespo Vazquez | |
| 2016/0167160 A1 | 6/2016 | Hellestam | |
| 2017/0182708 A1* | 6/2017 | Lin | B29C 64/393 |
| 2018/0065302 A1 | 3/2018 | Arai | |
| 2018/0264735 A1 | 9/2018 | Vilajosana | |
| 2019/0210285 A1 | 7/2019 | Tomioka | |
| 2019/0212572 A1 | 7/2019 | Tomioka | |
| 2019/0217540 A1 | 7/2019 | Tomioka | |
| 2019/0371642 A1* | 12/2019 | Iwai | H01L 21/681 |

FOREIGN PATENT DOCUMENTS

| | | |
|---|---|---|
| JP | H0231727 U | 2/1990 |
| JP | H04099618 A | 3/1992 |
| JP | H04232728 A | 8/1992 |
| JP | H04301431 A | 10/1992 |
| JP | H06270266 A | 9/1994 |
| JP | H08142203 A | 6/1996 |
| JP | H09076353 A | 3/1997 |
| JP | H09277384 A | 10/1997 |
| JP | H10180881 A | 7/1998 |
| JP | H10513130 A | 12/1998 |
| JP | 3173212 B2 | 6/2001 |
| JP | 2002331591 A | 11/2002 |
| JP | 2003507223 A | 2/2003 |
| JP | 2003345030 A | 12/2003 |
| JP | 2005131938 A | 5/2005 |
| JP | 3782049 B2 | 6/2006 |
| JP | 2007111989 A | 5/2007 |
| JP | 2009113294 A | 5/2009 |
| JP | 2009132126 A | 6/2009 |
| JP | 2009132127 A | 6/2009 |
| JP | 2009137048 A | 6/2009 |
| JP | 4499538 B2 | 7/2010 |
| JP | 5023975 B2 | 9/2012 |
| JP | 5082537 B2 | 11/2012 |
| JP | 2015016610 A | 1/2015 |
| JP | 2015030199 A | 2/2015 |
| JP | 2015058678 A | 3/2015 |
| JP | 2016087866 A | 5/2016 |
| JP | 2018503536 A | 2/2018 |
| MX | 2014012717 A | 4/2016 |
| WO | 9623647 A2 | 8/1996 |
| WO | 0114125 A1 | 3/2001 |

OTHER PUBLICATIONS

International Preliminary Report on Patentability issued in Intl. Appln. No. PCT/JP2017/034198 dated Apr. 11, 2019. English translation provided.
International Search Report issued in Intl. Appln. No. PCT/JP2017/034180 dated Oct. 24, 2017. English translation provided.
Written Opinion issued in Intl. Appln. No. PCT/JP2017/034180 dated Oct. 24, 2017. English translation provided.
International Preliminary Report on Patentability issued in Intl. Appln. No. PCT/JP2017/034180 dated Apr. 11, 2019. English translation provided.
International Search Report issued in Intl. Appln. No. PCT/JP2017/034183 dated Oct. 31, 2017. English translation provided.
Written Opinion issued in Intl. Appln. No. PCT/JP2017/034183 dated Oct. 31, 2017. English translation provided.
International Preliminary Report on Patentability issued in Intl. Appln. No. PCT/JP2017/034183 dated Apr. 11, 2019. English translation provided.
International Search Report issued in Intl. Appln. No. PCT/JP2017/034190 dated Dec. 19, 2017. English translation provided.
Written Opinion issued in Intl. Appln. No. PCT/JP2017/034190 dated Dec. 19, 2017. English translation provided.
International Preliminary Report on Patentability issued in Intl. Appln. No. PCT/JP2017/034190 dated Apr. 11, 2019. English translation provided.
Office Action issued in U.S. Appl. No. 16/299,324 dated May 28, 2020.
International Search Report issued in Intl. Appln. No. PCT/JP2017/034198 dated Nov. 28, 2017. English translation provided.
Written Opinion issued in Intl. Appln. No. PCT/JP2017/034198 dated Nov. 28, 2017.
Office Action issued in Chinese Appln. No. 201780059330.X dated Sep. 22, 2020. English translation provided.
Notice of Allowance issued in U.S. Appl. No. 16/354,657 dated Oct. 21, 2020.
Office Action issued in Japanese Application No. 2016-191240 dated Jul. 21, 2020. English translation provided.
Office Action issued in Japanese Application No. 2016-191241 dated Jul. 21, 2020. English translation provided.
Office Action issued in Japanese Appln. No. 2016-191582 dated Sep. 1, 2020. English machine translation provided.
Office Action issued in U.S. Appl. No. 16/299,324 dated Nov. 17, 2020.
Office Action issued in U.S. Appl. No. 16/354,657 dated Jul. 1, 2020.

* cited by examiner

OPTICAL SHAPING APPARATUS, MANUFACTURING METHOD, AND STORAGE MEDIUM

CROSS-REFERENCE TO RELATED APPLICATIONS

This application is a Continuation of International Patent Application No. PCT/JP2017/034198, filed on Sep. 22, 2017, which claims the benefit of Japanese Patent Application No. 2016-191582, filed on Sep. 29, 2016, both of which are hereby incorporated by reference herein in their entirety.

BACKGROUND OF THE INVENTION

Field of the Invention

The present invention relates to a technology for curing a photocurable resin and for shaping a three-dimensional object.

Description of the Related Art

The three-dimensional shaping generates two-dimensional shape data (image data) for each position in a height direction from three-dimensional shape data representing a shape of a three-dimensional object, sequentially forms and laminates a shaped layer having a shape corresponding to each of sectional shape data, and obtains a three-dimensional object (a shaped object). As one three-dimensional shaping method of this type, Japanese Patent Laid-Open No. ("JP") 2015-016610 discloses a method using a photocurable resin.

More specifically, a bottom surface of a container storing a liquid photocurable resin is formed of a light transmitting plate, and the photocurable resin is cured by the light irradiated from a bottom side of the light transmitting plate through the light transmitting plate. At this time, a single shaped layer is wholly and simultaneously cured by collectively projecting (irradiating) light modulated according to the sectional shape data through a light modulation element having a plurality of two-dimensionally arrayed pixels. Then, a three-dimensional object can be shaped by repeating the step of upwardly moving the cured shaped layer to form the next shaped layer.

This method can make the time required for shaping shorter than that of a method for sequentially curing the photocurable resin by scanning each laser beam (spot) for each shaped layer.

However, the three-dimensional shaping method that collectively projects the modulation light from the light modulation element onto the photocurable resin as disclosed in JP 2015-016610 is limited in shaping resolution or shaping size because the light modulation element has the limited number of pixels.

SUMMARY OF THE INVENTION

The present invention provides an optical shaping apparatus and the like which collectively irradiates modulation light from a light modulation element onto a photocurable resin for three-dimensional shaping with a higher resolution.

An optical shaping apparatus according to one aspect of the present invention includes a container having a light-transmissive portion and configured to store a liquid photocurable resin, a first optical unit including a light modulation element that has a plurality of pixels and is configured to modulate light from a first light source for each pixel, the first optical unit being configured to irradiate modulation light from the light modulation element onto the photocurable resin through the light-transmissive portion, a second optical unit including a scanning member configured to deflect light from a second light source, the second optical unit being configured to irradiate scanning light from the scanning member onto the photocurable resin through the light-transmissive portion, a control unit configured to control the light modulation element and the scanning member based on each of a plurality of two-dimensional shape data generated from three-dimensional shape data, and a moving member configured to move a cured portion cured by the modulation light and the scanning light among the photocurable resin in a direction separating from the light-transmissive portion. The first and second optical units do not include a common optical member. The controller controls the light modulation element and the scanning member so as to irradiate the modulation light onto a first resin area in the photocurable resin, and to irradiate the scanning light onto a second resin area in the photocurable resin.

A manufacturing method according to another aspect of the present invention configured to manufacture a three-dimensional object includes the steps of storing a liquid photocurable resin in a container having a light-transmissive portion, controlling a light modulation element having a plurality of pixels and being configured to modulate light from a first light source for each pixel and a scanning member configured to deflect light from a second light source based on each of a plurality of two-dimensional shape data generated from three-dimensional shape data, and irradiating modulation light from the light modulation element and scanning light from the scanning member through the light-transmissive portion onto the photocurable resin, moving a cured portion cured by the modulation light and the scanning light among the photocurable resin in a direction separating from the light-transmissive portion, and controlling the light modulation element and the scanning member so as to irradiate the modulation light onto a first resin area in the photocurable resin, and to irradiate the scanning light onto a second resin area.

A non-transitory computer-readable storage medium according to another aspect of the present invention stores an optically shaping program that enables a computer in an optical shaping apparatus to execute an optically shaping process. The optical shaping apparatus includes a container having a light-transmissive portion and configured to store a liquid photocurable resin, a first optical unit including a light modulation element that has a plurality of pixels and is configured to modulate light from a first light source for each pixel, the first optical unit being configured to irradiate modulation light from the light modulation element onto the photocurable resin through the light-transmissive portion, and a second optical unit including a scanning member configured to deflect light from a second light source, the second optical unit being configured to irradiate scanning light from the scanning member onto the photocurable resin through the light-transmissive portion. The optically shaping process includes the steps of controlling the light modulation element and the scanning member based on each of a plurality of two-dimensional shape data generated from three-dimensional shape data, and moving a cured portion cured by the modulation light and the scanning light among the photocurable resin in a direction separating from the light-transmissive portion, and controlling the light modulation element and the scanning member so as to irradiate the modulation light onto a first resin area in the photocurable resin, and to irradiate the scanning light onto a second resin area.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
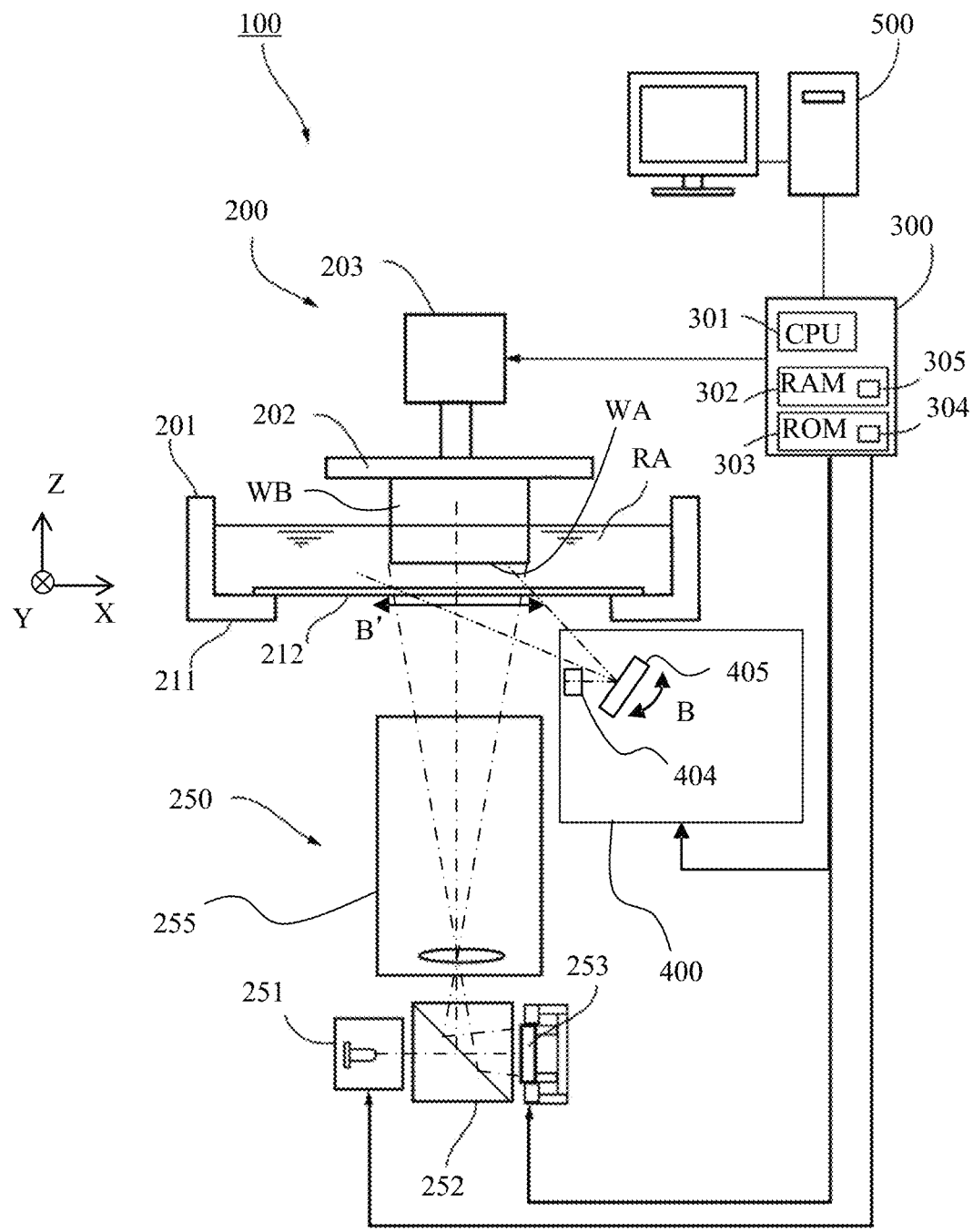
FIGS. 1A and 1B illustrate a configuration of a three-dimensionally shaping apparatus according to a first embodiment of the present invention.

FIG. 1A illustrates a configuration of a three-dimensionally shaping apparatus (optical shaping apparatus) according to a first embodiment of the present invention. A three-dimensionally shaping apparatus 100 forms a three-dimensionally shaped object by sequentially laminating shaped layers formed through irradiating and curing of a liquid photocurable resin with image light described later. This embodiment will illustratively describe image light as ultraviolet light (referred to as UV light hereinafter) and the ultraviolet curable resin (referred to as UV curable resin hereinafter) used as the photocurable resin. However, the image light other than the UV light and the photocurable resin other than the UV curable resin may be used.

The three-dimensionally shaping apparatus 100 includes a shaping unit 200 and a controller 300 for controlling the shaping unit 200. An image processing apparatus 500 as an external computer is connected to the controller 300.

The shaping unit 200 includes a container 201, a holding plate 202 as a moving member, a moving mechanism 203, and a projection unit 250. The container 201 includes a tank for storing a liquid UV curable resin RA, and has an opening in an upper portion. The container 201 includes a container body 211 and a light transmitting plate (light-transmissive portion or light transmitter) 212 having a light transmission property so as to close the opening formed on the bottom surface of the container body 211. The UV curable resin RA has a curing characteristic when receiving the UV light of a predetermined light amount or more. Hence, irradiating the UV light having a predetermined light amount or more only to a region to be cured can form the shaped object WB having an intended shape.

The light transmitting plate 212 has the UV/oxygen transmitting characteristic that transmits the UV light and oxygen. A thin fluoro-resin plate such as Teflon (registered trademark) AF2400 can be used for this light transmitting plate 212. The light transmitting plate 212 transmits oxygen in air and forms an oxygen-rich atmosphere at the interface with the UV-curable resin RA, thereby preventing the UV curable resin RA from being cured by the UV light (radical polymerization reaction). In other words, the UV curable resin RA is characterized in being curable by the UV light, and prevented from being cured in the oxygen-rich environment.

Figure 2A:
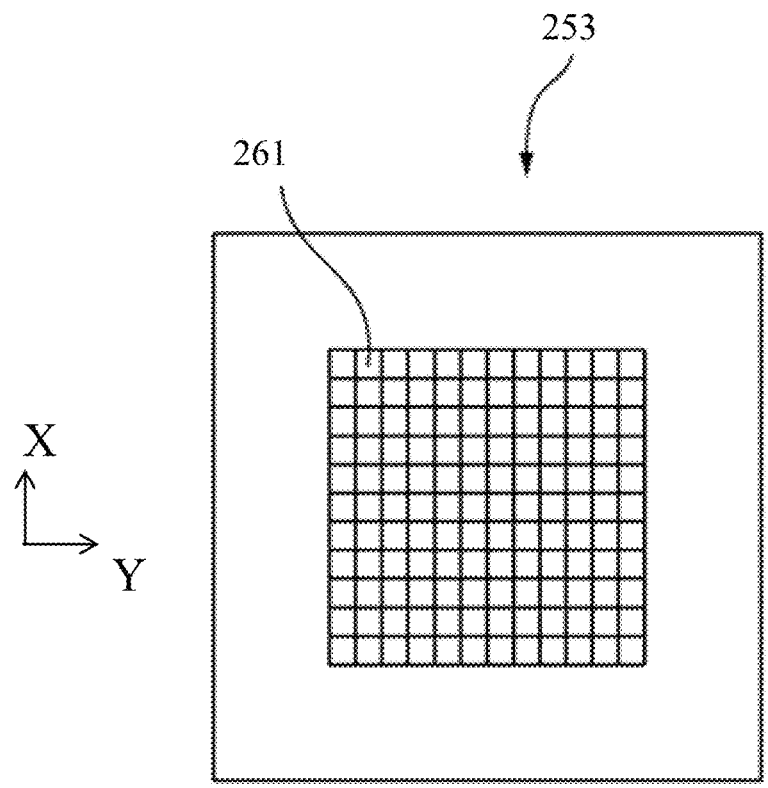
FIGS. 2A and 2B illustrate an image forming element and a shaping unit used for the three-dimensionally shaping apparatus according to the first embodiment.
Figure 2B:
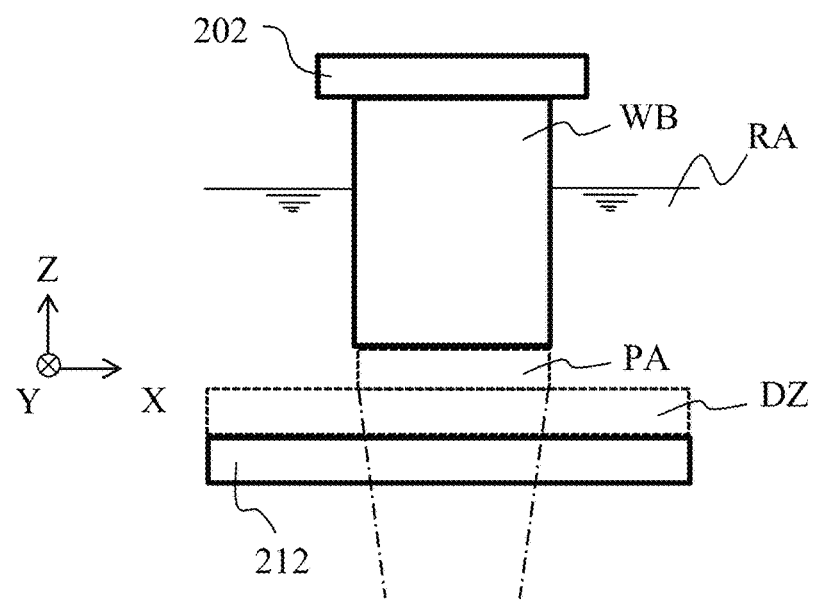

Therefore, as illustrated in FIG. 2B, a dead zone (dead band) DZ in which the UV curable resin RA is not cured even under the UV light is formed in a layer shape near the light transmitting plate 212. Then, a layered portion (referred to as a shaped resin liquid layer hereinafter) located just above the dead zone DZ of the UV curable resin RA is cured by the UV light (image light), thereby forming a shaped layer (intermediate in course of shaping) WA. Thereby, the shaped layer WA never adheres to the light transmitting plate 212.

Oxygen that permeates the light transmitting plate 212 may use oxygen in air as described above, or an unillustrated oxygen supply unit (nozzle) may be disposed near the light transmitting plate 212 to supply oxygen to the light transmitting plate 212. The shaping unit 200 or the entire three-dimensionally shaping apparatus 100 may be placed in a high-pressure oxygen atmosphere.

The moving mechanism 203 moves the holding plate 202 in the vertical direction through the upper opening in the container 201. The moving mechanism 203 includes a pulse motor, a ball screw, and the like, and moves the holding plate 202 at an arbitrary speed or an arbitrary pitch under control of the controller 300. The following description sets the moving direction (vertical direction in the drawing) of the holding plate 202 by the moving mechanism 203 in FIG. 1 to a Z direction (thickness direction) and the direction orthogonal to the Z direction (lateral direction in the drawing) to an X direction. The direction orthogonal to the Z direction and the X direction (the depth direction in the drawing) is set to a Y direction. The moving mechanism 203 moves the holding plate 202 in an (upward) direction separating from the light transmitting plate 212 and in a (downward) direction for making the holding plate 202 closer to the light transmitting plate 212 in the Z direction. During shaping, the holding plate 202 is upwardly moved from the lower end position facing the dead zone DZ. When the image forming light is irradiated onto the UV curable resin RA through the light transmitting plate 212 while the holding plate 202 is located at the lower end position, a first shaped layer is formed and adhered to the holding plate 202. The next shaped layer is laminated and formed on the first shaped layer between the first shaped layer and the dead zone DZ by irradiating the image light onto the UV curable resin RA through the light transmitting plate 212 while the first shaped layer is lifted by a predetermined amount from the lower end position. This procedure can form a shaped object WB in which a plurality of shaped layers WA sequentially formed are laminated.

The projection unit (first optical unit) 250 is disposed on the lower side of the container 201. The projection unit 250 includes a UV light source (first light source) 251, a beam splitter 252, an image forming element 253 as a light modulation element, a driving mechanism 254, and a projection optical system 255. If necessary, another optical element for changing the projection optical path may be added to the projection unit 250.

The UV light source 251, the beam splitter 252, and the light modulation element 253 are arranged in series in the X direction as the horizontal direction. A projection optical system 255 is disposed above (in the Z direction) the beam splitter 252. The projection optical system 255 is disposed so that its light emitting surface faces the light transmitting plate 212.

The UV light source 251 emits the UV light (first light) and includes an LED, a high-pressure mercury lamp, or the like. The UV light emitted from the UV light source 251 passes through the beam splitter 252 and irradiates the image forming element 253 with the UV light.

The image forming element 253 has a plurality of pixels, and modulates the irradiated UV light for each pixel to generate image light as modulation light. This embodiment uses a DMD (Digital Micro mirror Device) as the image forming element 253. As illustrated in FIG. 2, the image forming element 253 as the DMD includes a micro mirror in which each of the plurality of two-dimensionally arranged pixels 261 moves (rotates) between two angular positions (ON position and OFF position). Each pixel 261 can provide a binary control in which light and dark are expressed by the ON state where the mirror is located at the ON position and the OFF state where the mirror is located at the OFF position.

The image processing apparatus 500 generates a plurality of image data as two-dimensional shape data on a plurality of sections in the Z direction from previously prepared three-dimensional shape data as shape data of a three-dimensional object. Each image data is binary data including 1 indicating that it is a shaping pixel position or 0 indicating that it is a non-shaping pixel position for a plurality of two-dimensional pixel positions. The image processing apparatus 500 outputs to the controller 300 motion image data in which a plurality of image data are arranged in chronological order.

The controller 300 sequentially performs a binary control for each pixel 261 in the image forming element 253 based on each of the plurality of image data in the motion image data so as to modulate the UV light for each pixel 261, and generates the image light. Through the binary control over each pixel 261 in the image forming element 253 sequentially based on each of the plurality of corrected image data (two-dimensional shape data), as described above, the UV light is modulated for each pixel 261 to generate the image light. The controller 300 can perform a halftone control through a duty control that switches the ON state and OFF state of each pixel 261 at a high speed.

This embodiment describes the DMD used as the image forming element 253, but may use a reflection type liquid crystal panel or a transmission type liquid crystal panel as the image forming element 253. That illustration can also provide a halftone representation by high-speed switching of the reflectance or transmittance as well as the light and dark representation by the binary control over the reflectance or transmittance of a pixel. In addition, any element capable of forming the image light having light and dark or halftone can be used as the image forming element 253.

As described above, the beam splitter 252 transmits the UV light from the UV light source 251, and reflects the image light from the image forming element 253 toward the projection optical system 255. The projection optical system 255 includes one or a plurality of lenses, and projects (irradiates) the image light so that the image light from the image forming element 253 (the beam splitter 252) is imaged at a position optically conjugate with the image forming element 253 in the container 201. This embodiment sets the imaging position of the image light to the shaping position. The shaping position is a position just above the dead zone DZ in the container 201, and the shaped layer WA is formed when the shaped resin liquid layer PA located at the shaping position in the UV curable resins RA receives the image light. The shaped layer WA can be formed with a good resolution by imaging or making narrowest the image light from each pixel in the image forming element 253 at the shaping position.

The controller 300 controls the UV light source 251, the moving mechanism 203, the image forming element 253, and the driving mechanism 254 to instruct moving mechanism 203 to continuously or intermittently lift the holding plate 202 at a speed in synchronization with the formation (curing) of the shaped layer WA according to the above motion image. This configuration performs three-dimensional shaping so that the shaped object WB grows while its upper end is held by the holding plate 202.

Hence, the three-dimensionally shaping apparatus 100 according to this embodiment collectively projects the image light from the projection unit 250 to the shaping position in forming each of the plurality of sequentially laminated shaped layers WA and cures the shaped resin liquid layer PA at once. Therefore, the time required for shaping the shaped object WB becomes shorter than another apparatus that forms each shaped layer by scanning a laser beam or by applying the UV curable resin and by then irradiating light onto it.

The controller 300 is configured as a computer that includes a CPU 301, a RAM 302 having a work area used for a calculation in the CPU 301, and a ROM 303. The ROM 303 is a recording medium that records a program 304, and is a rewritable nonvolatile memory, such as an EEPROM. The CPU 301 executes a three-dimensional shaping process (three-dimensional object manufacturing method) described later for controlling the shaping unit 200 by reading the three-dimensional shaping program 304 as a computer program recorded in the ROM 303.

The three-dimensional shaping program 304 may be recorded in a non-transitory computer-readable storage medium, such as a nonvolatile memory (semiconductor memory or the like), a recording disk (optical disk or magnetic disk), and an external storage unit (hard disk drive).

Figure 1B:
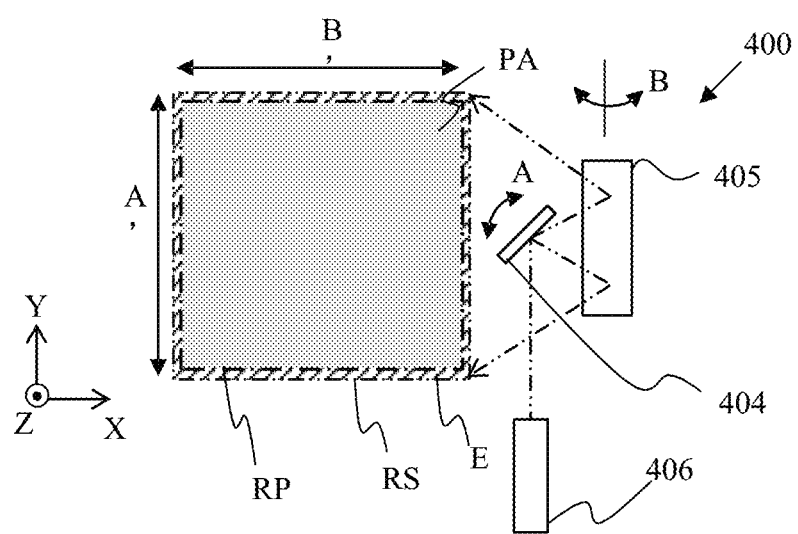
Figure 3:
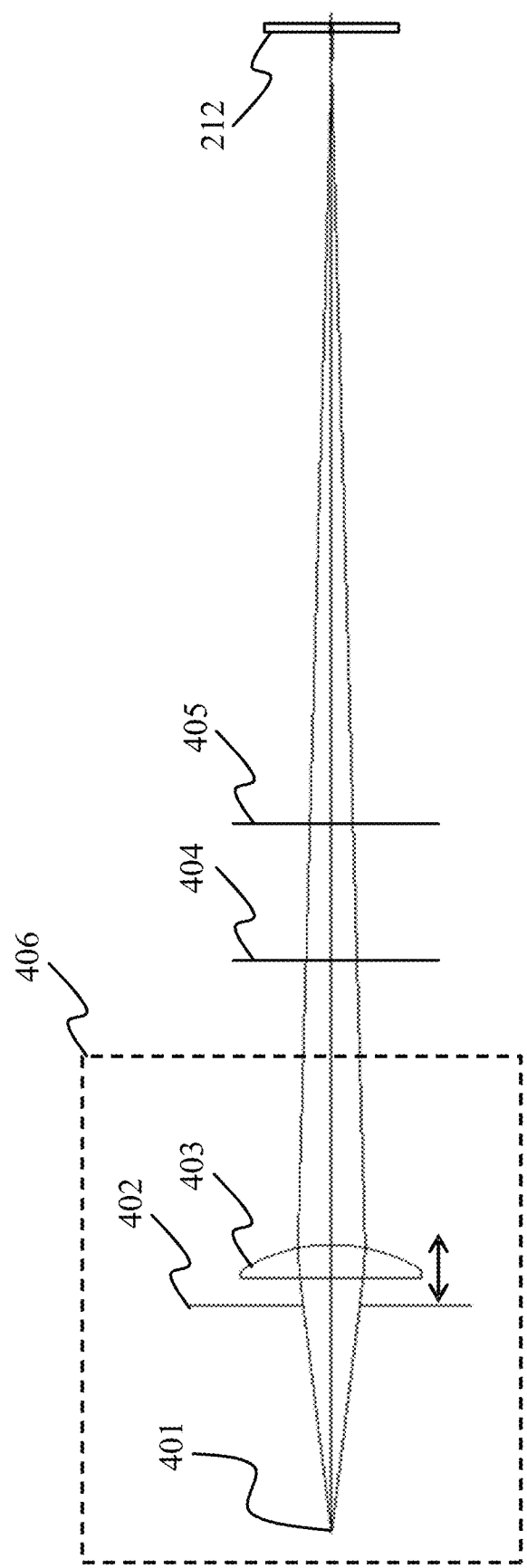
FIG. 3 illustrates a configuration of a laser scanning unit used for the three-dimensional shaping apparatus according to the first embodiment.

The three-dimensional shaping apparatus 100 according to this embodiment further includes a laser scanning unit (second optical unit) 400. The laser scanning unit 400 includes a laser light source unit 406, a first scanning member 404, and a second scanning member 405, as also illustrated in FIG. 1B, which corresponds to the XZ plane illustrated in FIG. 1A viewed from the Y direction. As illustrated in FIG. 3, the laser light source unit 406 includes a UV laser light source (second light source simply referred to as a laser light source hereinafter) 401, a diaphragm (aperture stop) 402, and an imaging lens 403. The laser light source 406 emits a laser beam (second light) having a wavelength different from that of the UV light source 251, which is herein shorter than that of the UV light source 251. For example, the UV light source 251 has a wavelength of 385 nm, and the laser light source 406 has a wavelength of 355 nm. The reason why the wavelength of the laser light source 406 is made shorter than that of the UV light source 251 will be described later.

Each of the first scanning member 404 and the second scanning member 405 include a galvanometer mirrors and can deflect incident light with a high accuracy. The first scanning member 404 swings within an angle A around an axis extending in the Z direction, and thereby the laser light emitted from the laser light source 406 and passing through the diaphragm 402 and the imaging lens 403 is irradiated in a Y-direction range within a width A'. The second scanning member 405 swings around the axis extending in the Y direction within an angle B, and thereby the laser beam scanned by the first scanning member 404 is irradiated onto an X-direction range within a width B'. Controlling swinging of the first and second scanning members 404 and 405 can deflect the laser beam (referred to as scanning light hereinafter) emitted from the laser scanning unit 400 in a two-dimensional direction within the XY plane. The controller 300 controls swinging of the first and second scanning members 404 and 405.

In this embodiment, the laser scanning unit 400 irradiates the scanning light in a direction inclined to the irradiation optical path (Z direction) of the image light from the projection unit 250 (projection optical system 255) through the light transmitting plate 212, onto the UV curable resin RA the light transmitting plate 212. More specifically, the projection unit 250 irradiates the image light onto the UV curable resin RA from a direction confronting the light transmitting plate 212. On the other hand, the laser scanning unit 400 irradiates the scanning light onto the UV curable resin RA through a space between the light transmitting plate 212 and the projection unit 250 from a direction inclined to the direction confronting the light transmitting plate 212. This configuration can irradiate the scanning light from the laser scanning unit 400 onto the UV curable resin RA through the light transmitting plate 212 without the interference with the projection unit 250. The projection optical system 255 used for the projection unit 250 is a rotationally symmetric optical system, and has difficulties in inclining its image plane. On the other hand, since the laser scanning unit 400 has the imaging lens 403 movable in the optical axis direction as a focusing unit, the image plane can be focused on the shaped resin liquid layer PA over the entire movable range. This is also the reason why the laser scanning unit 400 is inclined to the direction confronting the light transmitting plate 212 in irradiating light.

However, when the scanning light from the laser scanning unit 400 is irradiated from the direction inclined to the direction confronting the light transmitting plate 212 through a narrow space, the back focus of the laser scanning unit 400 becomes longer and it is difficult to make bright the exit-side F-number. It is difficult to narrow the spot diameter of the scanning light since the scanning light is obliquely introduced to the UV curable resin RA. Thus, as described above, this embodiment makes shorter the wavelength of the laser light source 406 than the wavelength of the UV light source 251 so as to facilitate narrowing the spot diameter of the scanning light.

This embodiment simultaneously irradiates the image light from the projection unit 250 and the scanning light from the laser scanning unit 400 onto the UV curable resin RA (shaped resin liquid layer PA) based on the image data on the same section. Then, the image light from the projection unit 250 is irradiated onto a first resin area in the shaped resin liquid layer PA and the scanning light from the laser scanning unit 400 is irradiated onto a second resin area. The second resin area may be contained in the first resin area, or at least part of the second resin area may be different from the first resin area. The second resin area is at least partially different from the first resin area when the second resin area contacts or at least partially overlaps the first resin area. The simultaneous irradiations of the image light and the scanning light onto the UV curable resin RA form a single shaped layer WA corresponding to the image data on the same section. The combination of the image light from the projection unit 250 and the scanning light from the laser scanning unit 400 in this way can improve the shaping speed using the image light and the shaping resolution using the scanning light.

Now, as illustrated in FIG. 1B, assume that RP is a maximum range (image light irradiatable range) in which the image light from the projection unit 250 can be irradiated onto the shaped resin liquid layer PA in the UV curable resin RA. Then, a maximum range (scanning light irradiatable range) RS in which the scanning light from the laser scanning unit 400 can be irradiated is set slightly wider than the image light irradiatable range RP so as to contain the image light irradiatable range RP. Thereby, as long as the image light is irradiated onto the following first resin area below the image light irradiatable range RP in the shaped resin liquid layer PA, the scanning light can be irradiated onto the second resin area E along the edge of the first resin area.

Figure 5A:
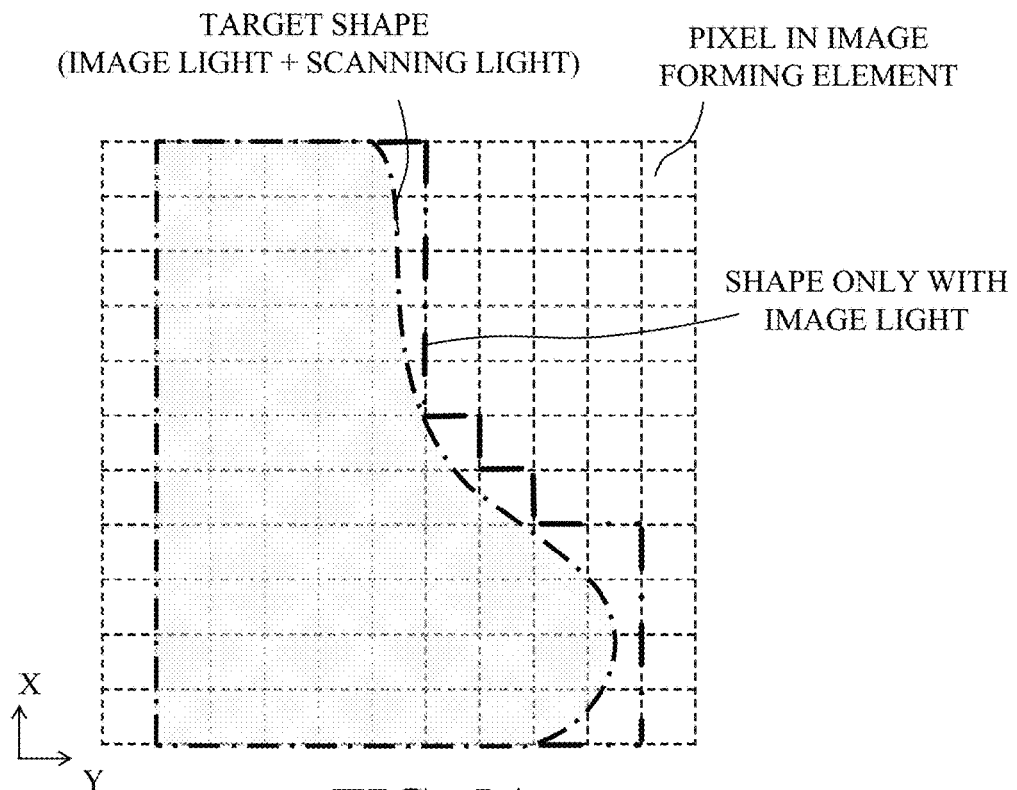
FIGS. 5A and 5B illustrate three-dimensional shape data, image light, and a scanning locus of scanning light used for the first embodiment.
Figure 5B:
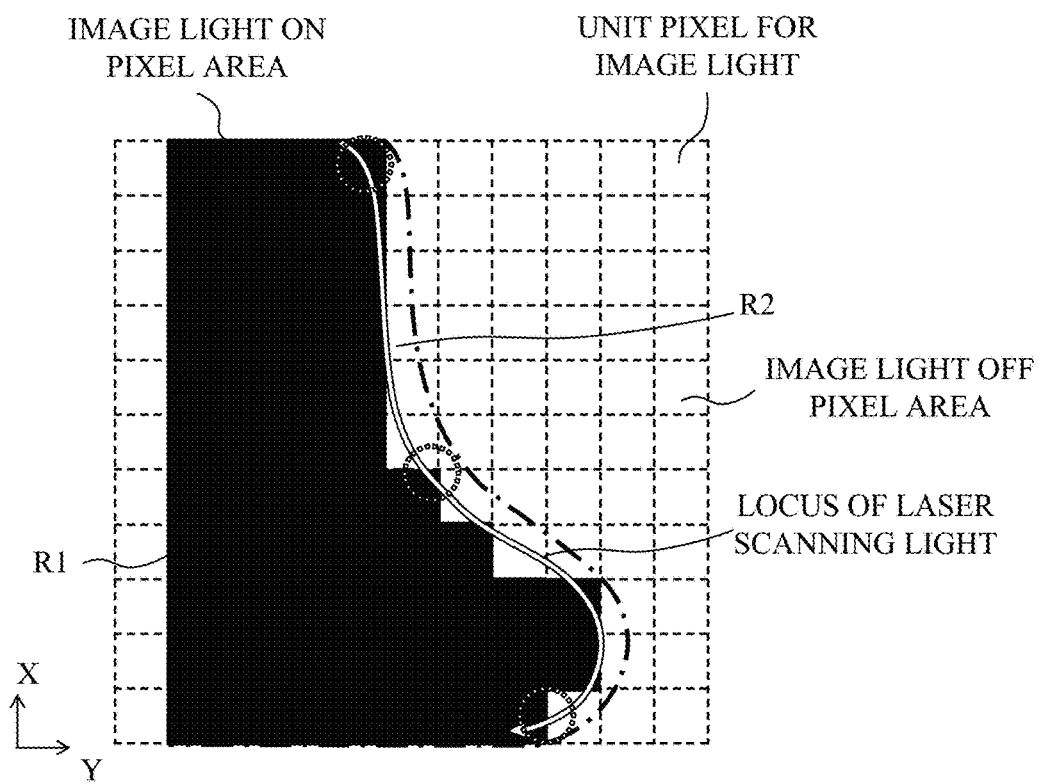

For example, in shaping a target shape expressed by an alternate long and short dash line in FIG. 5A, an irradiation of the image light would provide only a resolution of a pixel unit in the image forming element 253 (image data) and thus provide an uneven shape in comparison with the target shape as illustrated by an alternate long and two dashes line. On the other hand, as illustrated in FIG. 5B, a shape equal or close to the target shape can be obtained by irradiating the scanning light onto the second resin area R2 along the edge of the first resin area R1 onto which the image light is irradiated.

When it is difficult to perfectly correct the aberration of the off-axis image height in the projection optical system 255 in the projection unit 250, a good shaping accuracy can be obtained by shaping the off-axial image height with the scanning light.

The controller 300 adjusts the focus position of the scanning light by moving the imaging lens 403 in the optical axis direction as illustrated in FIG. 3 along with the deflection irradiation of the scanning light by the laser scanning unit 400 during shaping. Since distances from the first and second scanning members 404 and 405 to a variety of scanning positions with the scanning light on the XY plane are different from each other, the good shaping accuracy can be obtained by adjusting the focus position of the scanning light for each scanning position.

Figure 4:
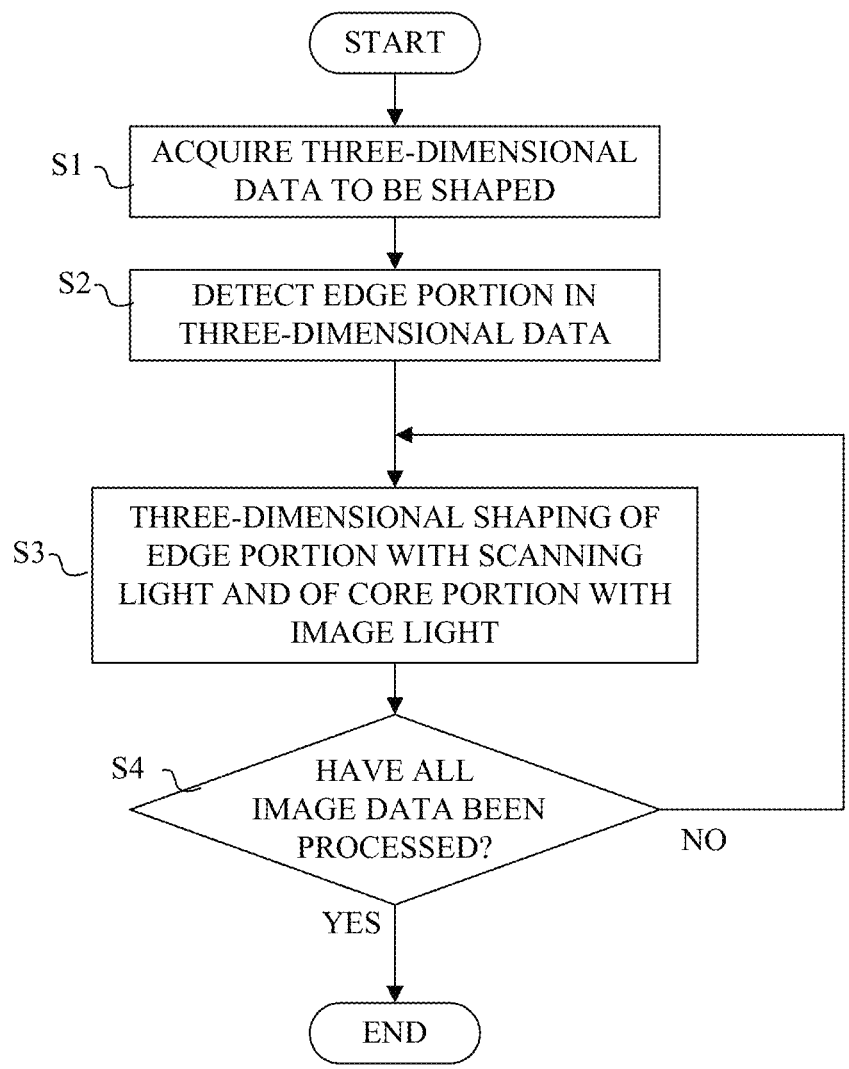
FIG. 4 is a flowchart of a three-dimensional shaping process according to the first embodiment.

A flowchart in FIG. 4 illustrates a flow of a three-dimensional shaping process executed by the CPU 301 in the controller 300 in accordance with a three-dimensional shaping program according to this embodiment.

In the step S1, the CPU 301 acquires from the image processing apparatus 500 motion image data (or three-dimensional shape data) in which a plurality of image data are arranged in chronological order.

Next, in the step S2, the CPU 301 detects, as an edge data area, a data area that becomes the edge portion after shaping, in each image data acquired in the step S1. Then, the CPU 301 divides each image data into an edge data area and another data area (referred to as a core data area hereinafter). The core data area corresponds to the first resin area in the shaped resin liquid layer PA and the edge data area corresponds to the second resin area. The processing of this step corresponds to setting first and second resin areas R1 and R2 based on the three-dimensional shape data.

Next, in the step S3, the CPU 301 controls the image forming element 253 based on the data of the core data area in each image data to irradiate the image light onto the first resin area in the shaped resin liquid layer PA. Simultaneously, the CPU 301 controls the first and second scanning members 404 and 405 based on the data of the edge data area to irradiate the scanning light onto the second resin area. The CPU 301 controls the moving mechanism 203 so that the holding plate 202 moves upwardly in synchronization with the irradiations of the image light and the scanning light corresponding to the image data. Thereby, the shaping layer WA having the core portion formed by the cured first resin area and the edge part formed by the cured second resin area is sequentially formed for each image data.

In the step S4, the CPU 301 determines whether irradiations of the image light and the scanning light have been completed for all of the plurality of image data contained in the motion image data. If there is remaining image data, the flow returns to the step S3 and repeats the processing from the step S2 to the step S5 until irradiations of the image light and the scanning light for all image data are completed.

Second Embodiment

Figure 6A:
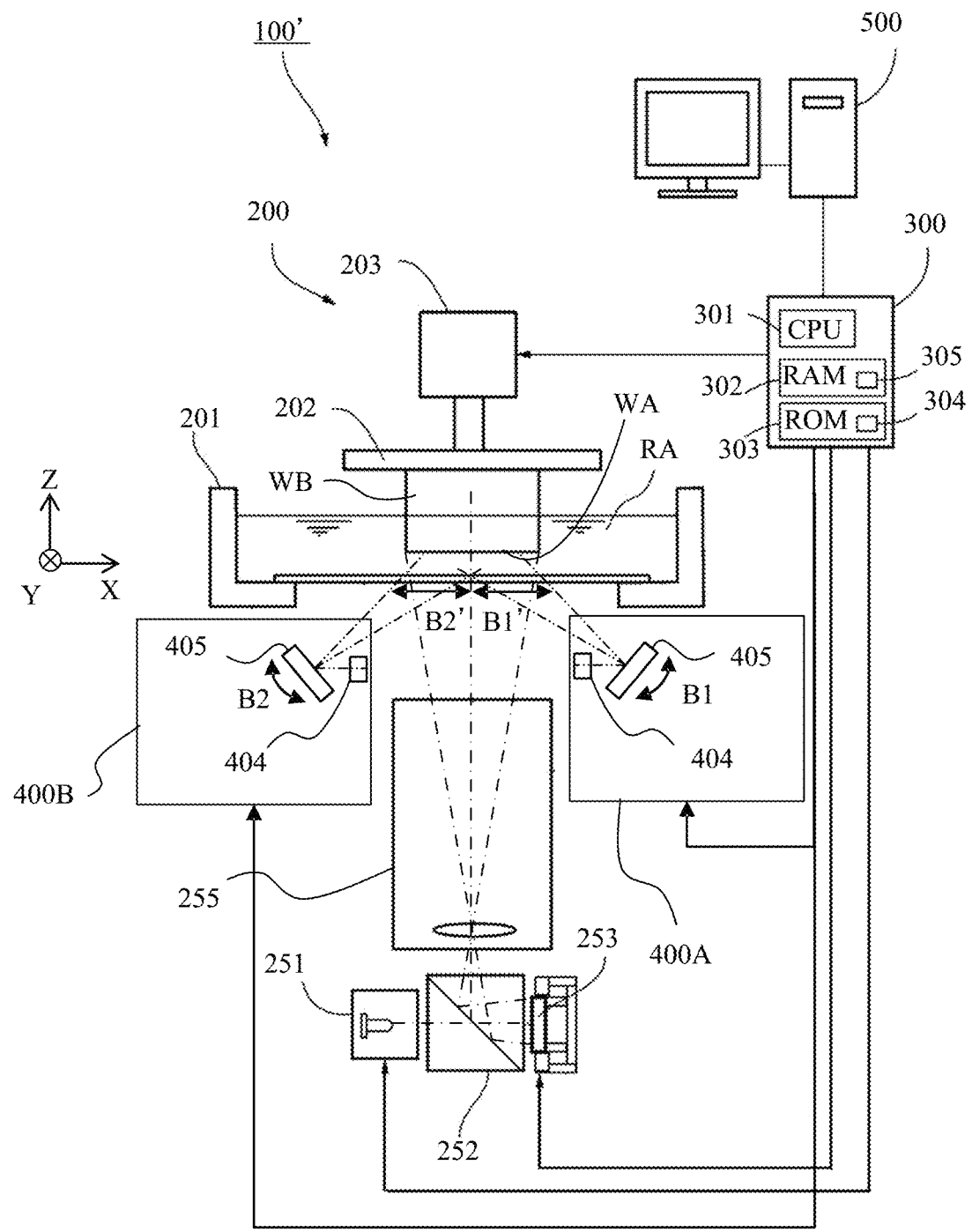
FIGS. 6A and 6B illustrate a configuration of a three-dimensional shaping apparatus according to a second embodiment of the present invention.
Figure 6B:
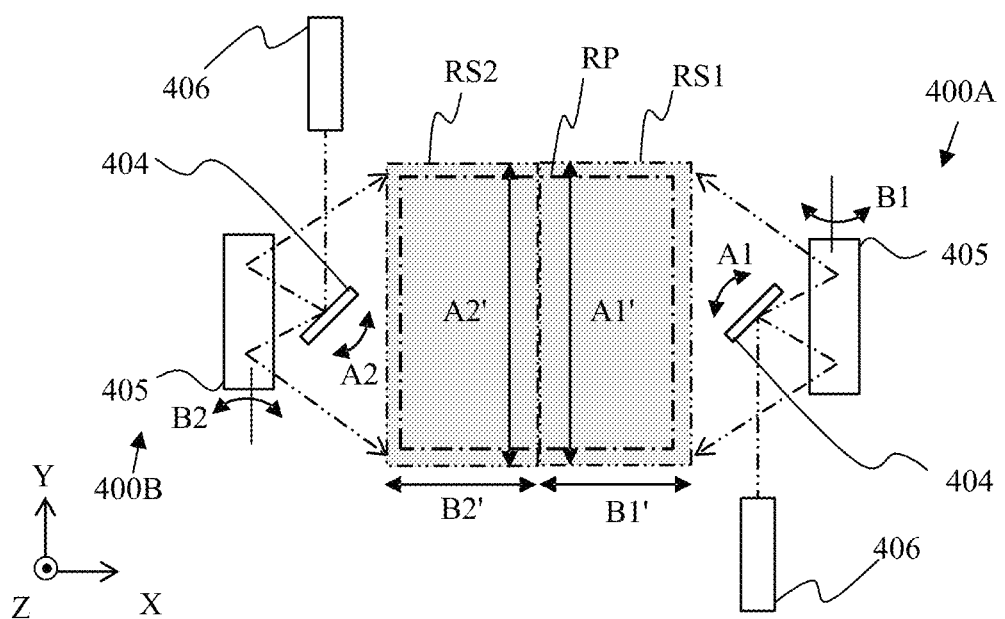

Referring now to FIGS. 6A and 6B, a description will be given of a three-dimensional processing apparatus 100' according to a second embodiment of the present invention. The basic configuration of the three-dimensional processing apparatus 100' according to this embodiment is the same as that of the first embodiment, and common elements will be designated by the same reference numerals as those in the first embodiment and a description thereof will be omitted.

The three-dimensional shaping apparatus 100' according to this embodiment includes two laser scanning units 400A and 400B corresponding to the laser scanning unit 400 described in the first embodiment. In other words, a plurality of (two) laser light scanning units 400A and 400B are combined for the single projection unit 250.

In shaping a shaped object WB having a larger XY sectional area, as in the first embodiment, attempting to irradiate the light from the single laser scanning unit 400 onto the resin area on the opposite side with respect to the projection unit 250 in the UV curable resin RA would cause the scanning light to interfere with the projection unit 250. An attempt to irradiate the scanning light onto a wide resin area in the UV curable resin RA would cause the incident angle of the scanning light to increase particularly in the resin area on the opposite side with respect to the projection unit 250. As a result, the spot diameter of the scanning light becomes large and the good resolution cannot be obtained. When the scanning light is applied to a wide resin area, a necessary focusing amount and thus the focusing time increase. This configuration delays the shaping speed.

Accordingly, this embodiment provides two laser beam scanning units 400A and 400B for the single projection unit 250. In the UV curable resin RA, the resin area (second resin area) onto which the scanning light is irradiated is shared by the two laser scanning units 400A and 400B and the shaping speed can be improved.

Each of the configurations of the laser scanning units 400A and 400B is the same as that of the laser scanning unit 400 described in the first embodiment. In the laser scanning unit 400A, the first scanning member 404 swings within an angle A1 around an axis extending in the Z direction, and thereby a laser beam emitted from the laser light source 406 (which has passed through the diaphragm 402 and the imaging lens 403) is irradiated onto a Y-direction range with a width A1'. The second scanning member 405 swings within the angle B1 around the axis extending in the Y direction, and thereby the laser beam scanned by the first scanning member 404 is irradiated onto an X-direction range with a width B1'. The width B1' of the scanning light irradiatable range RS1 of the laser scanning unit 400A corresponds to approximately half the scanning light irradiatable range RS in the first embodiment.

On the other hand, in the laser scanning unit 400B, the first scanning member 404 swings within an angle A2 around an axis extending in the Z direction, and thereby the laser beam emitted from the laser light source 406 is irradiated onto a Y-direction range with a width A2'. The second scanning member 405 swings within the angle B2 around an axis extending in the Y direction, and thereby the laser beam scanned by the first scanning member 404 is irradiated onto an X-direction range with a width B2'. The width B2' of the scanning light irradiatable range RS2 in the laser scanning unit 400B corresponds to approximately half the scanning light irradiatable range RS in the first embodiment. The scanning light irradiatable ranges RS1 and RS2 of the two laser scanning units 400A and 400B contain the image light irradiatable range RP of the single projection unit 250.

Figure 7:
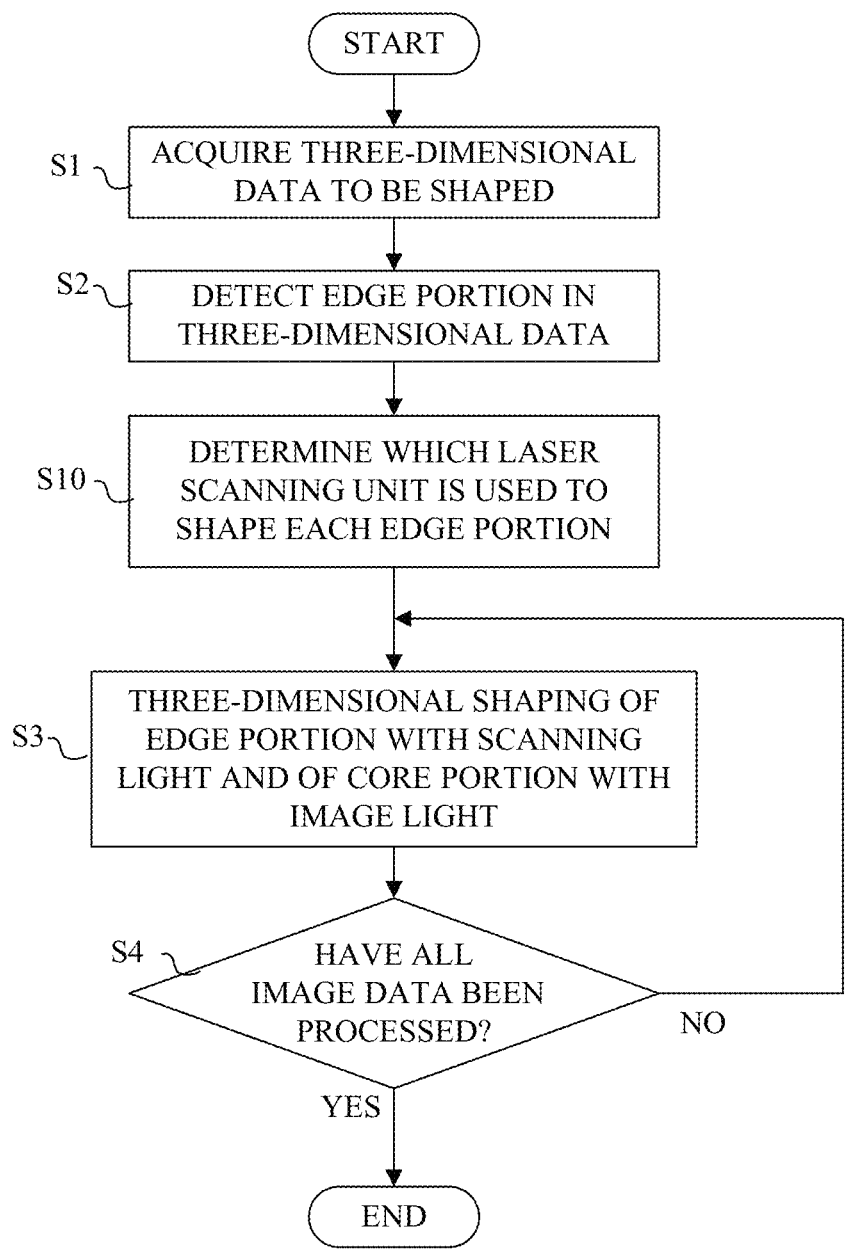
FIG. 7 is a flowchart of a three-dimensional shaping process according to the second embodiment.

A flowchart of FIG. 7 illustrates a flow of a three-dimensional shaping process executed by the CPU 301 in accordance with the three-dimensional shaping program in this embodiment. The steps S1, S2, S3, and S4 in the flowchart in FIG. 7 are the same as those in the flowchart illustrated in FIG. 3 in the first embodiment.

In the step S10 in FIG. 7, the CPU 301 determines which of the laser scanning units 400A and 400B is used to shape the edge data area detected for each image data in the step S2. In other words, the CPU 301 determines which of the laser scanning units 400A and 400B is used to irradiate each of the two scanning light irradiatable ranges (second resin areas) RS1 and RS2. More specifically, the CPU 301 selects for the laser scanning unit 400A the scanning light irradiatable range (second resin area) RS1 close to the laser scanning unit 400A, and for the laser scanning unit 400B the scanning light irradiatable range (second resin area) RS2 close to the laser scanning unit 400B. This configuration can prevent the scanning light from interfering with the projection unit 250, make shallow the incident angle of the scanning light, reduce the spot diameter, and shorten the focusing time during shaping. Thereafter, the CPU 301 proceeds to the step S3.

Third Embodiment

Figure 8:
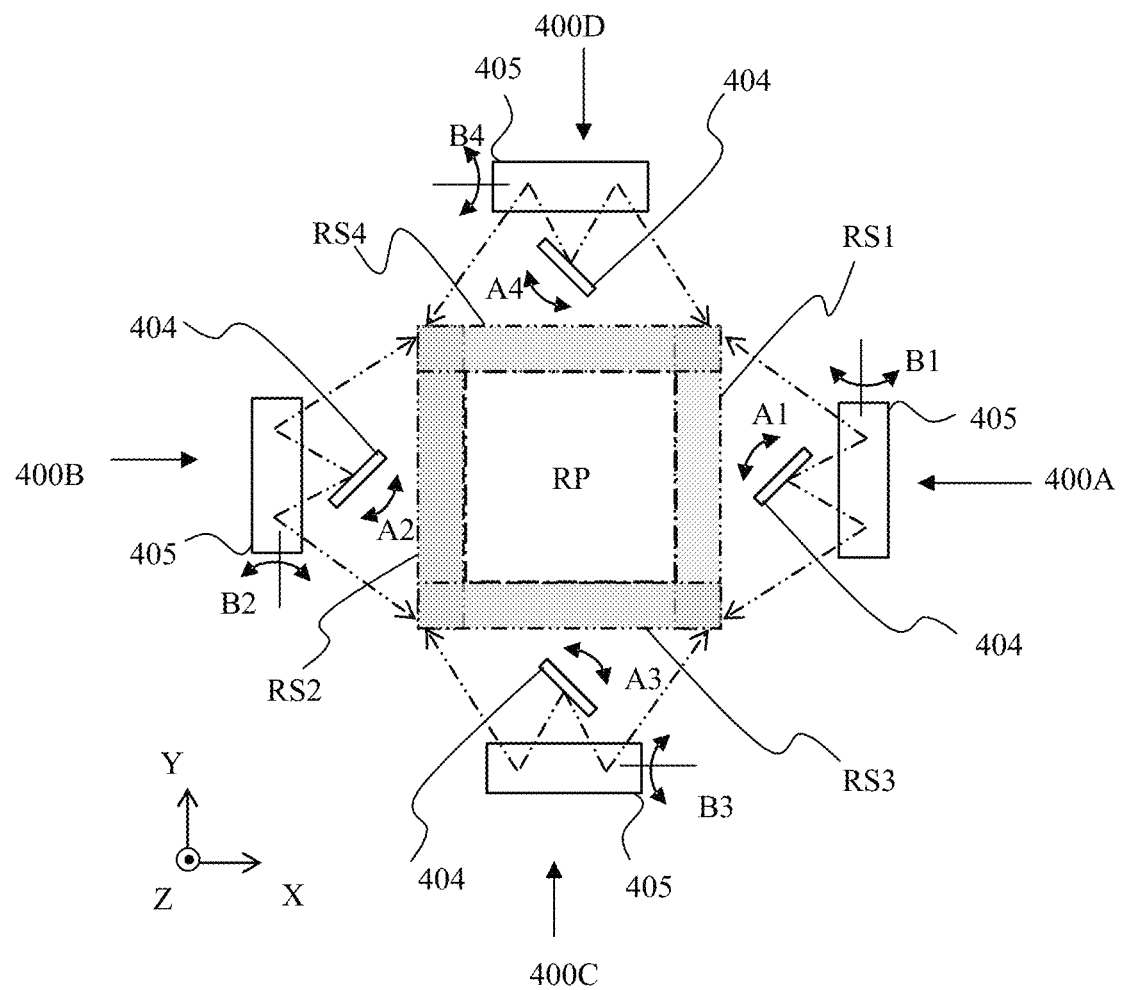
FIG. 8 illustrates a configuration of a three-dimensional shaping apparatus according to a third embodiment of the present invention.

Referring now to FIG. 8, a description will be given of a three-dimensional processing apparatus according to a third embodiment of the present invention. Since the basic configuration of the three-dimensional processing apparatus of this embodiment is the same as that of the first embodiment, common elements will be designated by the same reference numerals as those in the first embodiment and a description thereof will be omitted.

The three-dimensional shaping apparatus according to this embodiment includes four laser scanning units 400A, 400B, 400C, and 400D each corresponding to the laser scanning unit 400 described in the first embodiment. In other words, a plurality (four) laser light scanning units 400A to 400D are combined for the single projection unit 250.

In shaping the shaped object WB having a larger XY sectional area, the imaging performance of the projection optical system 255 lowers at the peripheral portion than at the central portion in the UV curable resin RA due to the aberration. Accordingly, this embodiment provides the laser scanning units 400A to 400D capable of irradiating the scanning light onto the four peripheral portions in the UV curable resin RA so as to successfully image the irradiation light (image light and scanning light) used for photocuring of the entire peripheral portions as well as the center portion. Thereby, a higher shaping accuracy and a higher shaping speed are realized for a large shaped object.

Each of the configurations of the laser scanning units 400A to 400D is the same as that of the laser scanning unit 400 described in the first embodiment. The laser scanning units 400A and 400B are the same as those in the second embodiment. However, the scanning light irradiatable ranges RS1 and RS2 of the laser scanning units 400A and 400B are respectively limited to the side closer to the laser scanning units 400A and 400B than the image light irradiatable range RP.

In each of the laser scanning units 400C and 400D, the first scanning members 404 swing within angles A3 and A4 around the axes extending in the Z direction, and the laser beams emitted from the laser light source 406 are irradiated onto the X direction ranges. The second scanning members 405 swing within angles B3 and B4 around the axes extending in the X direction, and thereby the laser beams deflected by the first scanning member 404 are irradiated onto the Y direction ranges closer to the laser scanning units 400C and 400D than the image light irradiatable range RP. In irradiating the light onto the same area, each laser scanning unit requires more time than the projection unit 250. Hence, in order to maintain the shaping speed, the irradiation area of the scanning light from each laser scanning unit is made smaller than that of the image light from the projection unit 250.

This embodiment sets the wavelength of the image light (UV light source 251) to 405 nm and the wavelength of the scanning light (laser light source 401) to 355 nm.

Figure 9:
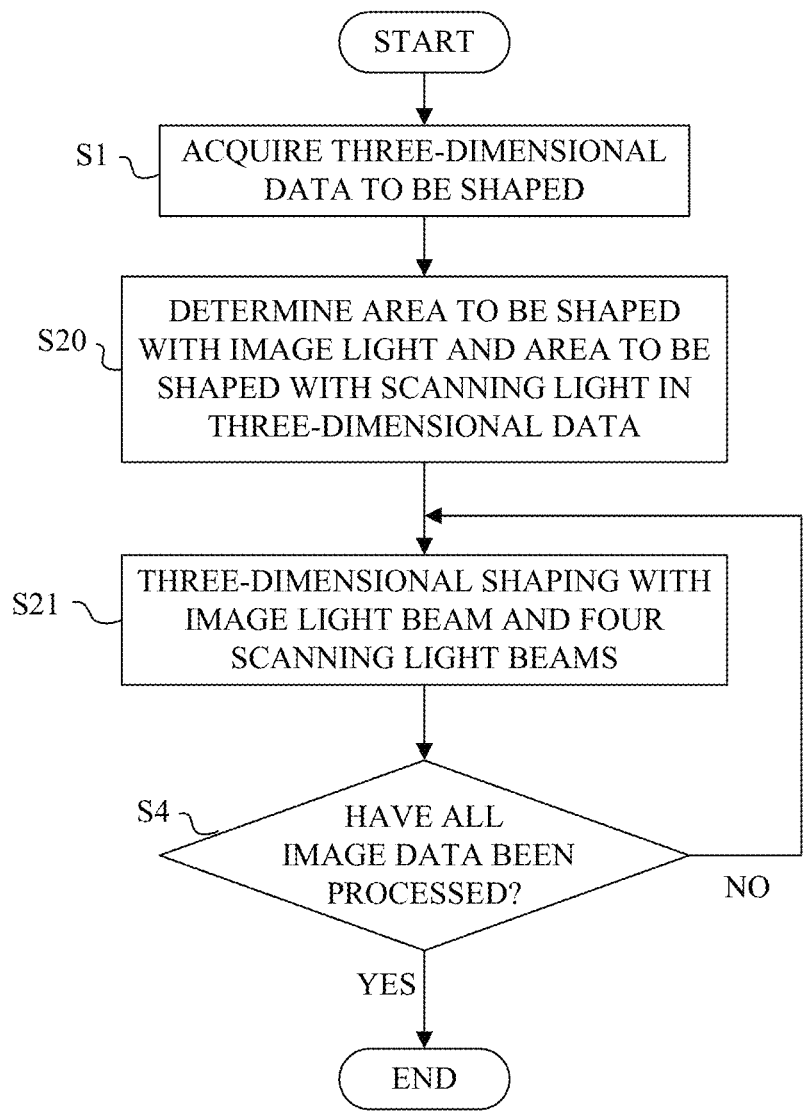
FIG. 9 is a flowchart of a three-dimensional shaping process according to the third embodiment.

A flowchart in FIG. 9 illustrates a flow of a three-dimensional shaping process executed by the CPU 301 in accordance with a three-dimensional shaping program in the present embodiment. The steps S1 and S4 in the flowchart in FIG. 9 are the same as those in the flowchart illustrated in FIG. 3 in the first embodiment.

In the step S20 in FIG. 9, the CPU 301 selects one of the image light from the projection unit 250 and the scanning light from the laser scanning units 400A to 400D to shape a plurality of data areas included in each image data acquired in the step S1. In the example illustrated in FIG. 8, the data area corresponding to the image light irradiatable range RP is shaped by the image light from the projection unit 250, and the data area corresponding to the scanning light irradiatable ranges RS1 to RS4 are shaped by the scanning light from the scanning units 400A to 400D. The data area corresponding to the scanning light irradiatable ranges RS1 to RS4 are not required to be the edge data area unlike the first and second embodiments.

In the step S21, the CPU 301 irradiates the image light and the scanning light onto the UV curable resin RA based on the determination result in the step S20 for shaping. Thereafter, the CPU 301 proceeds to the step S4.

Fourth Embodiment

The first to third embodiments describe the image light irradiated onto the UV curable resin RA in the container 201 through the light transmitting plate 212 provided at the bottom of the container 201 in the shaping unit 200. However, as in the shaping unit 200' according to a third embodiment of the present invention illustrated in FIG. 10A, the image light from the projection unit 250 may be irradiated onto the UV curable resin RA through the light transmitting plate 212 provided to a ceiling portion of the container 201'. In this case, the shaped layer WA may be sequentially formed by moving the holding plate 202' downwardly by the moving mechanism 203'.

Figure 10A:
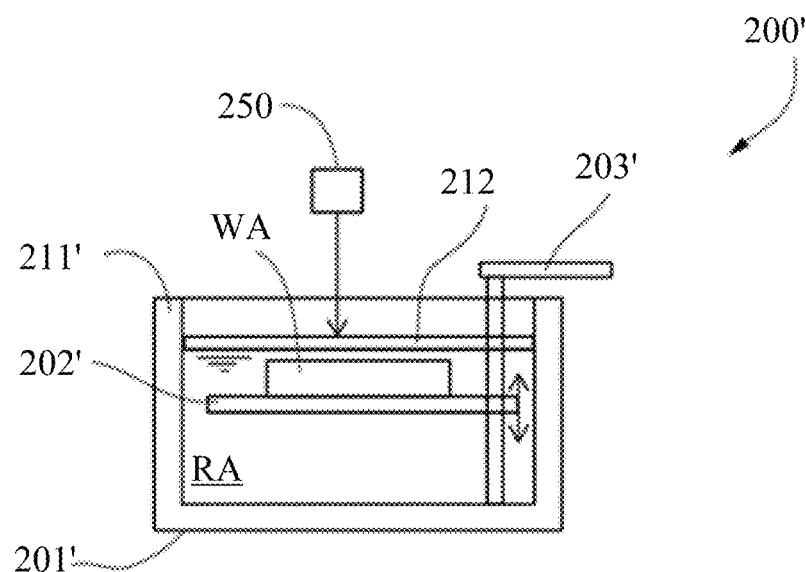
FIGS. 10A and 10B illustrate a shaping unit in a three-dimensional shaping apparatus according to a fourth embodiment of the present invention.
Figure 10B:
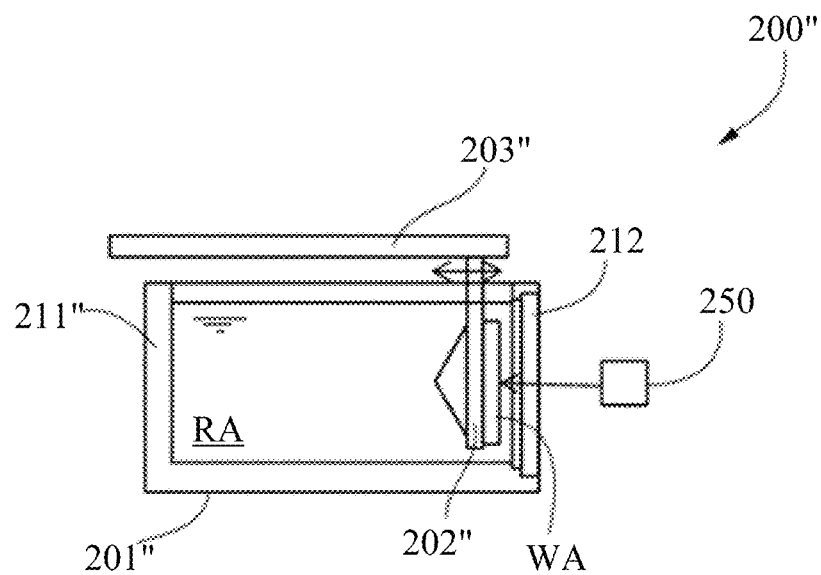

Further, as in the shaping unit 200" illustrated in FIG. 10B, the image light from the projection unit 250 may be irradiated onto the UV curable resin RA through the light transmitting plate 212 provided on a side surface portion of the container 201". In this case, the shaped layer WA may be sequentially formed while the moving mechanism 203" moves the holding plate 202" in the horizontal direction separating from the light transmitting plate 212.

Even the configurations illustrated in FIGS. 10A and 10B provides one or more laser scanning units although they are not illustrated, for three-dimensional shaping using the image light from the projection unit and the scanning light from the laser scanning unit(s).

Each of the above embodiments has described a dead zone formed by oxygen that has permeates through the light transmitting plate 212. However, a releasing agent (releasing layer) different from the UV curable resin RA may be provided between the UV curable resin RA and the light transmitting plate 212, or the container 201 (201', 201") may be micro vibrated so as to prevent the shaped layer from adhering to the light transmitting plate 212.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide three-dimensional shaping in a short time and with a high resolution by collectively irradiating modulation light from a light modulation element onto a photocurable resin and by irradiating scanning light from a scanning member onto the photocurable resin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical shaping apparatus comprising:
    a container having a light-transmissive portion and configured to store a liquid photocurable resin;
    a first optical unit including a light modulation element that has a plurality of pixels and is configured to modulate light from a first light source for each pixel, the first optical unit being configured to irradiate modulation light from the light modulation element onto the photocurable resin through the light-transmissive portion;
    a plurality of second optical units each including a scanning member configured to deflect light from a second light source, the plurality of second optical units being configured to irradiate scanning light from the scanning members thereof onto the photocurable resin through the light-transmissive portion;
    a controller configured to control the light modulation element and the scanning members based on each of a plurality of two-dimensional shape data generated from three-dimensional shape data; and
    a moving member configured to move a cured portion of the photocurable resin cured by the modulation light and the scanning light in a direction separating from the light-transmissive portion,
    wherein the first optical unit and the plurality of second optical units do not include a common optical member, and
    wherein the controller controls:
        the light modulation element to irradiate the modulation light onto a first resin area in the photocurable resin; and
        the scanning members to irradiate the scanning light onto a second resin area in the photocurable resin.

2. The optical shaping apparatus according to claim 1, wherein the controller sets the first and second resin areas based on the three-dimensional shape data.

3. The optical shaping apparatus according to claim 1, wherein:
    the first optical unit irradiates the modulated light to a first irradiating area,
    the plurality second optical units irradiate the scanning light to the second irradiating area, and
    the first irradiating area is different from at least part of the second irradiating area.

4. The optical shaping apparatus according to claim 3, wherein center positions of the first and second areas are different from each other.

5. The optical shaping apparatus according to claim 3, wherein the second resin area contacts or at least partially overlaps the first resin area.

6. The optical shaping apparatus according to claim 3, wherein portion of the second resin area is disposed along an edge of the first resin area.

7. The optical shaping apparatus according to claim 1, wherein the plurality of second optical units irradiate the scanning light onto the photocurable resin from a direction inclined to an irradiation optical path of the modulated light from the first optical unit onto the photocurable resin.

8. The optical shaping apparatus according to claim 1, wherein each of the plurality of second optical units includes a focusing unit configured to focus the scanning light on different positions of the photocurable resin.

9. The optical shaping apparatus according to claim 1, wherein:
    the second resin area is divided into a plurality of divided resin areas, and
    the controller determines which of the plurality of second optical units is used to irradiate the scanning light onto each of the plurality of divided resin areas.

10. The optical shaping apparatus according to claim 1, wherein the second light source emits light having a wavelength different from that of the first light source.

11. The optical shaping apparatus according to claim 10, wherein the second light source emits the light having the wavelength shorter than that of the first light source.

12. The optical shaping apparatus according to claim 1, wherein an irradiation area of the scanning light on the photocurable resin is smaller than that of the modulated light.

13. A manufacturing method configured to manufacture a three-dimensional object, the manufacturing method comprising the steps of:
    storing a liquid photocurable resin in a container having a light-transmissive portion;
    controlling a first optical unit, which includes a light modulation element having that has a plurality of pixels and is configured to modulate light from a first light source for each pixel, and a plurality of second optical units, which each include a scanning member configured to deflect light from a second light source based on each of a plurality of two-dimensional shape data generated from three-dimensional shape data, to irradiating the modulation light from the light modulation element through the light transmissive portion onto the photocurable resin and the scanning light from the scanning members of the plurality of second optical units through the light-transmissive portion onto the photocurable resin;
    moving a cured portion of the photocurable resin cured by the modulation light and the scanning light in a direction separating from the light-transmissive portion;
    controlling the light modulation element to irradiate the modulation light onto a first resin area in the photocurable resin; and
    controlling the scanning members to irradiate the scanning light onto a second resin area in the photocurable resin.

14. A non-transitory computer-readable storage medium storing an optically shaping program executable by a computer in an optical shaping apparatus to execute an optically shaping method, the optical shaping apparatus including a container having a light-transmissive portion and configured to store a liquid photocurable resin, a first optical unit including a light modulation element that has a plurality of pixels and is configured to modulate light from a first light source for each pixel, the first optical unit being configured to irradiate modulation light from the light modulation element onto the photocurable resin through the light-transmissive portion, and a plurality of second optical units each including a scanning member configured to deflect light from a second light source, the plurality of second optical units being configured to irradiate scanning light from the scanning members onto the photocurable resin through the light-transmissive portion, the optically shaping method comprising the steps of:

- controlling the light modulation element and the scanning members based on each of a plurality of two-dimensional shape data generated from three-dimensional shape data;
- moving a cured portion of the photocurable resin cured by the modulation light and the scanning light in a direction separating from the light-transmissive portion; and
- controlling the light modulation element to irradiate the modulation light onto a first resin area in the photocurable resin; and
- controlling the scanning members to irradiate the scanning light onto a second resin area in the photocurable resin.

\* \* \* \* \*